(12) United States Patent
Kohli et al.

(10) Patent No.: US 8,599,068 B2
(45) Date of Patent: Dec. 3, 2013

(54) SYSTEMS AND METHODS FOR MOBILE TERMINAL LOCATION VERIFICATION

(76) Inventors: Sanjai Kohli, Manhattan Beach, CA (US); Per Kristian Enge, Mountain View, CA (US); Keith J Brodie, Irvine, CA (US)

( * ) Notice: Subject to any disclaimer, the term of this patent is extended or adjusted under 35 U.S.C. 154(b) by 138 days.

(21) Appl. No.: 13/253,745

(22) Filed: Oct. 5, 2011

(65) Prior Publication Data

US 2012/0122471 A1  May 17, 2012

Related U.S. Application Data

(60) Provisional application No. 61/390,033, filed on Oct. 5, 2010.

(51) Int. Cl.
*G01S 19/32* (2010.01)

(52) U.S. Cl.
USPC ........................................... 342/357.72

(58) Field of Classification Search
USPC ............ 342/357.25, 357.4, 357.62, 357.72; 455/456.1; 701/468
See application file for complete search history.

(56) References Cited

U.S. PATENT DOCUMENTS

| | | | | |
|---|---|---|---|---|
| 5,953,367 | A * | 9/1999 | Zhodzicshsky et al. | 375/147 |
| 6,762,714 | B2 * | 7/2004 | Cohen et al. | 342/357.29 |
| 7,333,053 | B2 * | 2/2008 | Lawrence et al. | 342/357.72 |

* cited by examiner

*Primary Examiner* — Dao Phan
(74) *Attorney, Agent, or Firm* — Steven Chen

(57) ABSTRACT

Methods and systems for using W-code to extend anti-spoof capability to civilian GPS receivers for verifying locations of mobile terminals are disclosed. A system for verifying a reported location of a mobile terminal includes a receiver of the mobile terminal and a verification processor. The receiver processes the radio ranging signals to generate measured quantities related to the W-code to the verification processor. The receiver also provides the reported location of the mobile terminal to the verification processor. The verification processor generates expected quantities related to the W-code based on the reported location of the mobile terminal. The verification processor further compares the measured quantities related to the W-code to the expected quantities related to the W-code to verify the reported location of the mobile terminal.

20 Claims, 2 Drawing Sheets

SYSTEMS AND METHODS FOR MOBILE TERMINAL LOCATION VERIFICATION

CROSS-REFERENCE TO RELATED APPLICATIONS

This patent application claims the benefit of the priority date of U.S. provisional patent application Ser. No. 61/390,033, filed on Oct. 5, 2010, pursuant to 35 USC 119. The entire contents of this provisional patent application are hereby expressly incorporated by reference.

TECHNICAL FIELD

The present disclosure relates generally to systems and methods for verifying the location of a mobile terminal. More particularly, the present invention relates to systems and methods for using Global Navigation Satellite Systems (GNSS) signals for verifying the location of a mobile terminal that are immune to spoofers.

BACKGROUND

There is a recognized need to locate mobile terminals. Mobile terminals include cell phones, smart phones, note computers, tablet computers such as the iPad, and other mobile computing devices wirelessly connected to a communication network. The location of a mobile terminal is needed for 911 calls, enabling of location-based services, mapping, navigation assistance, and other applications. Multiple technologies have been deployed for locating mobile terminals including the use of Global Positioning System (GPS) receivers in the mobile terminals, Assisted-GPS (AGPS) in which the GPS receiver is aided by data obtained from the communication network, Time Difference of Arrival (TDOA) in which differences in signal receipt times to multiple network communication sites are used to estimate mobile terminal locations, signal multipath maps, signal power maps, an other techniques. Of the many technologies deployed, the use Global Navigation Satellite System (GNSS) signals such as GPS is becoming increasing prevalent. Other GNSS systems include the Russian GLONASS system, the Chinese COMPASS system, and the European Galileo system.

GNSS systems are typically dual-use systems having a civilian component with publicly disclosed coding to support general use and a secure component with undisclosed and encrypted coding for military applications. For example, in the GPS system the C/A code is a publicly disclosed code that is modulated onto the 1575.42 MHz (L1) carrier of the GPS signal to support most commercial applications. By comparison, military receivers make use of the Y-code, a composite of a publicly-disclosed P-code and an undisclosed/encrypted W-code.

Since the C/A code is known, it is relatively simple to spoof a C/A code GPS receiver, whereby the receiver is fooled into producing an incorrect location or navigation fix by a spoofer artificially generating signals with C/A code modulation to present to the receiver. In contrast, it is very difficult to spoof a Y-code receiver since the W-code is not known outside of organizations authorized to make use of it. Without knowledge of the W-code it is virtually impossible to generate a-priori signals representing a false location to present to the receiver. As such, the W-code is one of the GPS's anti-spoof (AS) techniques. It precludes an adversary from deceiving the Y-code GPS receiver for obvious reasons in military applications.

As the ubiquity of mobile computing devices grows, it is becoming increasingly important to extend anti-spoofing capability to GNSS receivers in the civilian world. For example, the problem of falsified transactions, particularly financial transactions, has become an increasing burden on consumers, banks, stores, and the national financial infrastructure. One element in a system to defend against electronic fraud and identify theft is the capability to ensure that the location of a mobile terminal is known, even in the threat of a spoofer. Therefore, there is a need to verify that the location reported by a mobile terminal is true.

BRIEF SUMMARY

In accordance with one or more embodiments of the present invention, a system for verifying a reported location of a mobile terminal includes a receiver of the mobile terminal and a verification processor. The receiver receives radio ranging signals broadcast from signal sources at known locations. Each of the radio ranging signals is modulated by a first publicly disclosed code and a first undisclosed code. The first undisclosed code is also a composite of a second publicly disclosed code and a second undisclosed code, where the second undisclosed code has a lower bandwidth than the first undisclosed code. The receiver processes the radio ranging signals to generate measured quantities related to the second undisclosed code to the verification processor. The receiver also provides the reported location of the mobile terminal to the verification processor. The verification processor generates expected quantities related to the second undisclosed code based on the reported location of the mobile terminal. The verification processor further compares the measured quantities related to the second undisclosed code to the expected quantities related to the second undisclosed code to verify the reported location of the mobile terminal.

In accordance with one or more embodiments of the present invention, a method for verifying a reported location of a mobile terminal includes receiving by the mobile terminal radio ranging signals broadcast from signal sources at known locations. Each of the radio ranging signals is modulated by a first publicly disclosed code and a first undisclosed code. The first undisclosed code is also a composite of a second publicly disclosed code and a second undisclosed code, where the second undisclosed code has a lower bandwidth than the first undisclosed code. The method also includes processing the radio ranging signals to generate measured quantities related to the second undisclosed code. The method further including providing the reported location of the mobile terminal. The method further includes generating expected quantities related to the second undisclosed code based on the reported location of the mobile terminal. The method further includes comparing the measured quantities related to the second undisclosed code to the expected quantities related to the second undisclosed code to verify the reported location of the mobile terminal.

This invention will be more fully understood in conjunction with the following detailed description taken together with the following drawings.

BRIEF DESCRIPTION OF THE DRAWINGS

Embodiments of the present invention and their advantages are best understood by referring to the detailed description that follows. It should be appreciated that like reference numerals are used to identify like elements illustrated in one or more of the figures.

DETAILED DESCRIPTION

Methods and systems for using W-code to extend anti-spoof capability to civilian GPS receivers for verifying locations of mobile terminals are disclosed. Investigations of W-code have been conducted for various civilian applications, many of which began from the desire to make use of the Y-code modulated L2 carrier of the GPS signal in survey receivers. One such study determines that the W-code chip rate is approximately $\frac{1}{20}^{th}$ of the P-code chip rate and reviews methods that may be used to recover the L2 carrier from the Y-code modulated L2 signal (See "Optimum Semi-Codeless Carrier Phase Tracking of L2" by K. T. Woo of NavCom Technology, presented at the Institute of Navigation (ION) Satellite Division meeting in Nashville in 1999, which is incorporated herein by reference [Woo]), The study also notes the use of high-gain antennas directed at the GPS satellites for enabling the determination of the W-code chip rate and timing with respect to the publicly-disclosed P-code.

GPS receivers authorized to receive Y-code, such as those used for military applications, are resistant to spoofers because a spoofer cannot generate a prompt W-code, and therefore cannot construct the Y-code a-priori to spoof the Y-code receivers. The present disclosure extends the anti-spoofing capability of Y-code to civilian receivers by recording and transmitting quantities related to the received W-code to a verification processor. The verification processor compares these quantities to those that would result from the actual W-code. The actual W-code chips may be determined a-posteriori at one or more monitor stations. As such, a civilian receiver may be spoofed by an artificially generated C/A code, but this spoofing is detected by the verification processing, since the spoofed position cannot include correct W-code derived quantities. Therefore, for the civilian receiver, the W-code enables spoofing detection, and in the absence of spoofing, location verification.

The determination of actual W-code chips with high gain antennas is known in the art and is also discussed in Woo. A sophisticated spoofer may make use of the known methods to obtain W-code values and construct Y-code spoofer signals which generate the correct W-code derived quantities consistent with a C/A code spoofer signal, but such Y-code spoofer signals cannot be generated a-priori or even promptly. This is because the W-code must be determined a-posteriori and then applied with proper time-phasing in a signal generator deployed against the target GPS receiver. The processing and transport delays associated with the generation of the Y-code spoofer signals implies that even a sophisticated spoofer's spoofing attempt is detectable by measuring the difference time as encoded in the GPS solution and wall-clock time.

Figure 1:
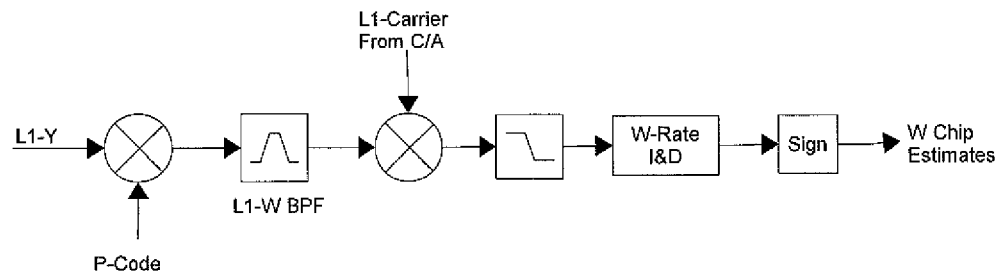
FIG. 1 is a block diagram for a W-chip estimator for L1 operating in a mobile terminal or in a combination of mobile terminal/verification processor to generate W-chip estimates according to one or more embodiments of the present invention.

FIG. 1 is a block diagram for a W-chip estimator for L1 operating in a mobile terminal or in a combination of mobile terminal/verification processor to generate W-chip estimates according to one or more embodiments of the present invention. In one embodiment of the present invention, the mobile terminal may provide a position report and down-converted L1 band samples to a verification processor. The verification processor may process the L1 samples as shown in FIG. 1 to generate W-codes chip estimates and may compare the W-code chip estimates with known time-phased W-code chip sequence from the monitor station to verify that the location report was not the result of a spoofer. However, a significant amount of data for the L1 band samples may need to be transmitted from the mobile terminal to the verification processor, loading the communication network.

In another embodiment of the present invention, the W-chip estimates are provided by the mobile terminal. The mobile terminal operates on the L1 band Y-code samples during the time the mobile terminal processes the C/A code samples to make a position fix. The resulting position fix from the mobile terminal is augmented with an estimated W-chip sequence for one or more satellites and reported to the verification processor. The estimated W-chip sequence is generated by correlating the L1 band Y-code samples with P-code to remove the P-code and perform an integrate-and-dump over a W-chip period to obtain the sign of the W-code. The position fix is verified at the verification processor by comparing the mobile terminal reported W-chip sequence with the known W-chip sequence time-phase corrected for the reported location. It is noted that in this embodiment, for the W-rate I&D to integrate the sampled data over a W-chip period, the mobile terminal has knowledge of W-chip chip epochs with respect to the P-code.

Figure 2:
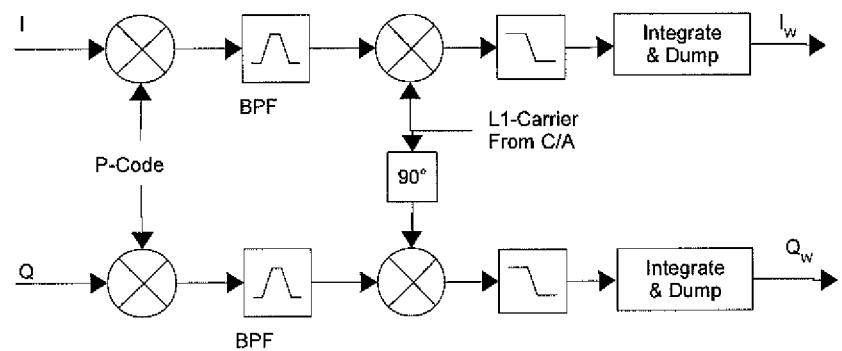
FIG. 2 is a block diagram of I/Q quadrature channels of a GPS receiver operating in a mobile terminal to generate W-code information without knowledge of W-code chip epochs according one or more embodiments of the present invention.

FIG. 2 is a block diagram of I/Q quadrature channels of a GPS receiver operating in a mobile terminal to generate W-code information without knowledge of W-code chip epochs according one or more embodiments of the present invention. In FIG. 2 the integrate-and-dump processing at the end of the signal processing chain is no longer synchronized to the W-code chip epochs. The integrate and dump may re-sample the W-code signal at a rate nearly equal to the chipping rate of the W-code, reducing its sample rate following removal of the known C/A and P codes. Thus, FIG. 2 compresses wideband L1 I and Q signal samples to a narrower band to reduce the data bandwidth needed to carry the unknown W-code information to the verification processor. As such, FIG. 2 uses less communication bandwidth than transmitting raw L1 band samples even when the mobile terminal has no knowledge of W-code chip epochs.

Figure 3:
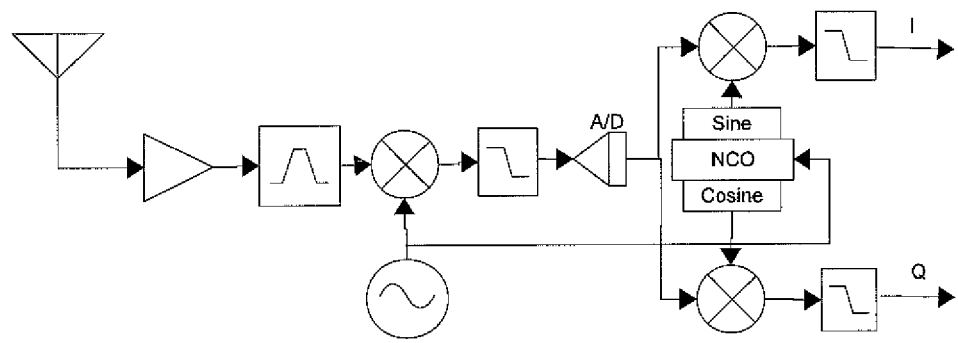
FIG. 3 is a block diagram of a representative front-end of a GPS receiver operating in a mobile terminal to capture quadrature samples for W-code estimation and verification.

FIG. 3 is a block diagram of a representative front-end of a GPS receiver operating in a mobile terminal to capture quadrature samples for W-code estimation and verification. In FIG. 3, GNSS samples are down-converted to a low IF frequency and split into quadrature components. However, the wide-bandwidth samples sent to the verification processor for W-code estimation and verification requires large communication bandwidth. It is desirable to minimize the use of the communication network bandwidth for transmitting W-code information from the mobile terminal while also maximizing its anti-spoofing capability.

Figure 4:
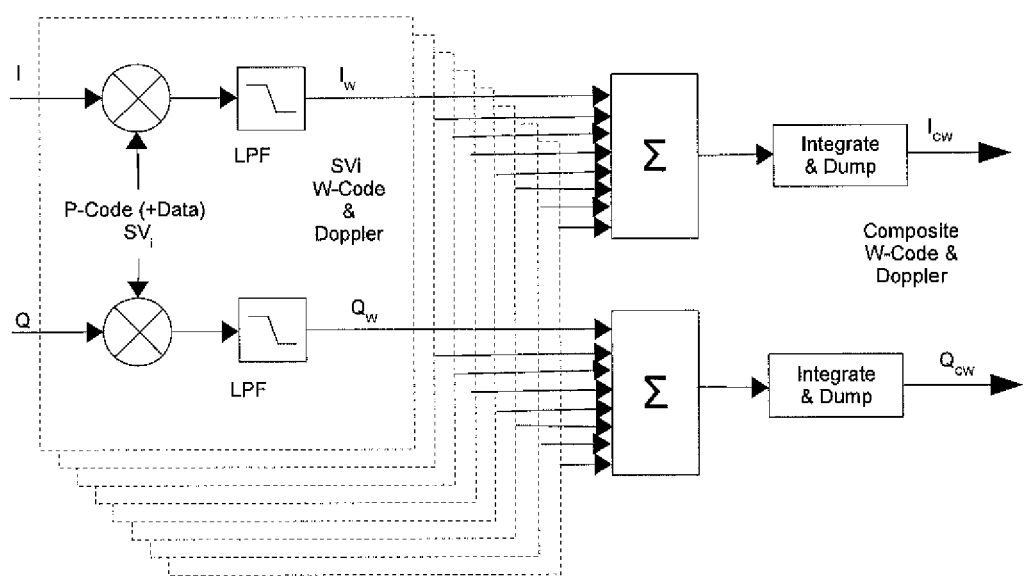
FIG. 4 is a block diagram of quadrature channels of a GPS receiver operating in a mobile terminal to generate reduced bandwidth W-code information of a plurality of satellites according to one or more embodiments of the present invention.

FIG. 4 is a block diagram of quadrature channels of a GPS receiver operating in a mobile terminal to generate reduced bandwidth W-code information of a plurality of satellites according to one or more embodiments of the present invention. In FIG. 4, signal samples representing a composite W-code signal are sent to the verification processor. To generate the composite W-code signal, known P-code, and the data modulation if available, are stripped for each of the satellites for which the code offset for the P-code is known, i.e. a satellite used in the local position solution. The samples stripped of P-code and data are recombined and re-sampled at a lower rate through the common integrate and dump. For example, the integrate-and-dump may re-sample the composite W-code signal at a rate nearly equal to the chipping rate of the W-code. This reduced bandwidth composite W-code signal is then transmitted to the verification processor.

In another embodiment of FIG. 4, the Doppler frequency for each satellite is stripped as well before the signals are recombined. This has the advantage of allowing still further reduction in the required communication bandwidth but may yield a composite signal with less channel separation. The W-code composite signal that minimizes communication bandwidth while maximizing anti-spoofing capability of the mobile terminal is likely a function of the ratio of the carrier to noise density in the signal environment.

In accordance with one or more embodiments of the present invention, a position report from a user's mobile terminal may be used to verify the user's location at the time of a secured transaction. For example, a transaction site is a location where a user conducts the transaction. The transaction site may be an ATM, a store, a brokerage, a bank counter, the entrance to a secure facility, or any other location where a transaction takes place between a user and an organization. The actual location of the transaction site is known a-priori to the organization. To verify that the user is at the site conducting the transaction, the user's mobile terminal may be requested to make a position report to the organization over the mobile terminals' communication network. The anti-spoofing capability of the user's mobile terminal prevents a criminal from spoofing the user's mobile terminal from into reporting its location at the transaction site when it's not.

For example, a user's ATM card may have been swiped and forged, and his PIN observed. The criminal generates a forged card from the swiped data and goes to an ATM with the intent of using the forged card and observed PIN to steal money from the user's bank account. In accordance with the present disclosure, when the user's PIN is entered the ATM may initiate short-range communication with the user's mobile terminal to request that a position report be sent over the mobile terminal's communication network to the organization. The organization may user this report to verify that the transaction underway is being made by someone at least in possession of the user's mobile terminal at the transaction site. The short range communication can be through Bluetooth, near-field communication, or other means. By nature of being short-range, it provides another level of assurance that the user's mobile terminal is at the transaction site.

Embodiments described above illustrate, but do not limit, the invention. It should also be understood that numerous modifications and variations are possible in accordance with the principles of the present invention. Accordingly, the scope of the invention is defined only by the following claims.

What is claimed is:

1. A system for verifying a reported location of a mobile terminal comprising:
    a receiver of the mobile terminal adapted to:
        receive a plurality of radio ranging signals broadcast from a plurality of signal sources at known locations, wherein each of the radio ranging signals is modulated by a first publicly disclosed code and a first undisclosed code, wherein the first undisclosed code includes a composite of a second publicly disclosed code and a second undisclosed code, and wherein the second undisclosed code has a lower bandwidth than the first undisclosed code;
        process the plurality of radio ranging signals to generate measured quantities related to the second undisclosed code; and
        provide the reported location of the mobile terminal; and
    a verification processor adapted to:
        receive the measured quantities related to the second undisclosed code and the reported location of the mobile terminal;
        generate expected quantities related to the second undisclosed code based on the reported location of the mobile terminal; and
        compare the measured quantities related to the second undisclosed code to the expected quantities related to the second undisclosed code to verify the reported location of the mobile terminal.

2. The system of claim 1, wherein the receiver is adapted to process the first publicly disclosed code of the plurality of radio ranging signals to provide the reported location of the mobile terminal.

3. The system of claim 1, wherein the receiver is adapted to provide the reported location when the mobile terminal initiates an electronic transaction at a known location.

4. The system of claim 1, wherein the receiver is further adapted to transmit the measured quantities related to the second undisclosed code and the reported location of the mobile terminal to the verification processor over a communication network.

5. The system of claim 1, wherein the plurality of radio ranging signals are broadcast from a plurality of satellites of a Global Navigation Satellite System (GNSS).

6. The system of claim 5, wherein the GNSS is the Global Position System (GPS), the first publicly disclosed code is C/A code, the first undisclosed code is Y code, the second publicly disclosed code is P code, and the second undisclosed code is W code.

7. The system of claim 1, wherein the receiver is further adapted to down-convert and sample the plurality of radio ranging signals to generate down-converted samples of the plurality of radio ranging signals for the measured quantities related to the second undisclosed code, and the verification processor is further adapted to correlate the down-converted samples with the second publicly disclosed code of the plurality of radio ranging signals.

8. The system of claim 1, wherein the receiver is further adapted to:
    correlate the plurality of radio ranging signals with the first publicly disclosed code and with the second publicly disclosed code of one of the radio ranging signals to generate a signal stripped of the first and second publicly disclosed code; and
    integrate the signal stripped of the first and second publicly disclosed code over a chip period of the second undisclosed code to obtain an estimated chip sequence of the second undisclosed code as the measured quantities related to the second undisclosed code.

9. The system of claim 1, wherein the receiver is further adapted to:
    create quadrature samples of the plurality of radio ranging signals;
    correlate the quadrature samples with the first publicly disclosed code and with the second publicly disclosed code of one of the radio ranging signals to generate a quadrature signal stripped of the first and second publicly disclosed code; and integrate the quadrature signal stripped of the first and second publicly disclosed code at a rate approximate a chipping rate of the second undisclosed code to generate the measured quantities related to the second undisclosed code.

10. The system of claim 1, wherein the receiver is further adapted to:
create quadrature samples of the plurality of radio ranging signals;
correlate the quadrature samples with the first publicly disclosed code and with the second publicly disclosed code of each of the radio ranging signals to generate a quadrature signal stripped of the first and second publicly disclosed code for each of the radio ranging signals;
combine the quadrature signal stripped of the first and second publicly disclosed code for each of the radio ranging signals to generate a composite quadrature signal; and
integrate the composite signal at a rate approximate a chipping rate of the second undisclosed code to generate the measured quantities related to the second undisclosed code.

11. The system of claim 10, wherein the quadrature signal stripped of the first and second publicly disclosed code is also stripped of a Doppler frequency to generate a quadrature signal stripped of the first and second publicly disclosed code and the Doppler frequency for each of the radio ranging signals, and the quadrature signal stripped of the first and second publicly disclosed code and the Doppler frequency for each of the radio ranging signals are combined to generate the composite quadrature signal.

12. The system of claim 1, wherein the expected quantities related to the second undisclosed code based on the reported location of the mobile terminal comprises a known sequence of the second undisclosed code time-phase corrected for the reported location of the mobile terminal.

13. A method for verifying a reported location of a mobile terminal comprising:
receiving by the mobile terminal a plurality of radio ranging signals broadcast from a plurality of signal sources at known locations, wherein each of the radio ranging signals is modulated by a first publicly disclosed code and a first undisclosed code, wherein the first undisclosed code includes a composite of a second publicly disclosed code and a second undisclosed code, and wherein the second undisclosed code has a lower bandwidth than the first undisclosed code;
processing the plurality of radio ranging signals to generate measured quantities related to the second undisclosed code;
providing the reported location of the mobile terminal;
generating expected quantities related to the second undisclosed code based on the reported location of the mobile terminal; and
comparing the measured quantities related to the second undisclosed code to the expected quantities related to the second undisclosed code to verify the reported location of the mobile terminal.

14. The method of claim 13, wherein the providing the reported location of the mobile terminal comprises processing the first publicly disclosed code of the plurality of radio ranging signals to provide the reported location of the mobile terminal.

15. The method of claim 13, wherein the plurality of radio ranging signals are broadcast from a plurality of the Global Positioning System (GPS) satellites, the first publicly disclosed code is C/A code, the first undisclosed code is Y code, the second publicly disclosed code is P code, and the second undisclosed code is W code.

16. The method of claim 13, wherein the processing the plurality of radio ranging signals comprises:
down-converting and sampling the plurality of radio ranging signals to generate down-converted samples of the plurality of radio ranging signals; and
correlating the down-converted samples of the plurality of radio ranging signals with the second publicly disclosed code of the plurality of radio ranging signals to generate measured quantities related to the second undisclosed code.

17. The method of claim 13, wherein the processing the plurality of radio ranging signals comprises:
correlating the plurality of radio ranging signals with the first publicly disclosed code and with the second publicly disclosed code of one of the radio ranging signals to generate a signal stripped of the first and second publicly disclosed code; and
integrating the signal stripped of the first and second publicly disclosed code over a chip period of the second undisclosed code to obtain an estimated chip sequence of the second undisclosed code to generate the measured quantities related to the second undisclosed code.

18. The method of claim 13, wherein the processing the plurality of radio ranging signals comprises:
creating quadrature samples of the plurality of radio ranging signals;
correlating the quadrature samples with the first publicly disclosed code and with the second publicly disclosed code of one of the radio ranging signals to generate a quadrature signal stripped of the first and second publicly disclosed code; and
integrating the quadrature signal stripped of the first and second publicly disclosed code at a rate approximate a chipping rate of the second undisclosed code to generate the measured quantities related to the second undisclosed code.

19. The method of claim 13, wherein the processing the plurality of radio ranging signals comprises:
creating quadrature samples of the plurality of radio ranging signals;
correlating the quadrature samples with the first publicly disclosed code and with the second publicly disclosed code of each of the radio ranging signals to
combining the quadrature signal stripped of the first and second publicly disclosed code for each of the radio ranging signals to generate a composite quadrature signal; and
integrating the composite signal at a rate approximate a chipping rate of the second undisclosed code to generate the measured quantities related to the second undisclosed code.

20. The method of claim 13, wherein the processing the plurality of radio ranging signals comprises:
creating quadrature samples of the plurality of radio ranging signals;
correlating the quadrature samples with the first publicly disclosed code and with the second publicly disclosed code of each of the radio ranging signals to generate a quadrature signal stripped of the first and second publicly disclosed code for each of the radio ranging signals;
stripping a Doppler frequency from the quadrature signal stripped of the first and second publicly disclosed code of each of the radio ranging signals to generate a quadrature signal stripped of the first and second publicly disclosed code and the Doppler frequency for each of the radio ranging signals;

combining the quadrature signal stripped of the first and second publicly disclosed code and the Doppler frequency for each of the radio ranging signals to generate a composite quadrature signal; and integrating the composite signal at a rate approximate a chipping rate of the second undisclosed code to generate the measured quantities related to the second undisclosed code.

* * * * *